United States Patent
Smith

(10) Patent No.: US 6,574,754 B1
(45) Date of Patent: Jun. 3, 2003

(54) SELF-MONITORING STORAGE DEVICE USING NEURAL NETWORKS

(75) Inventor: Gordon James Smith, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/503,457

(22) Filed: Feb. 14, 2000

(51) Int. Cl.⁷ .................. G06F 11/30; G06F 15/173
(52) U.S. Cl. .................. 714/47; 714/42; 714/26; 709/224; 706/26
(58) Field of Search .................. 709/223, 224, 709/325; 706/26, 27, 21, 24, 23; 714/26, 25, 33, 39, 47, 42; 711/111, 100

(56) References Cited

U.S. PATENT DOCUMENTS

| | | | |
|---|---|---|---|
| 5,168,413 A | | 12/1992 | Coker et al. .................. 360/137 |
| 5,325,510 A | * | 6/1994 | Frazier .................. 711/118 |
| 5,392,295 A | | 2/1995 | Coker et al. .................. 371/21.2 |
| 5,448,722 A | * | 9/1995 | Lynne et al. .................. 706/49 |
| 5,737,519 A | * | 4/1998 | Abdelnour et al. .................. 714/39 |
| 6,199,018 B1 | * | 3/2001 | Quist et al. .................. 702/34 |
| 6,434,512 B1 | * | 8/2002 | Discenzo .................. 702/184 |

* cited by examiner

Primary Examiner—Mehmet B. Geckil
(74) Attorney, Agent, or Firm—Roy W. Truelson

(57) ABSTRACT

A digital data storage device such as a rotating magnetic disk drive contains an on-board condition monitoring system, comprising a neural network coupled to multiple inputs derived from measured parameters of disk drive operation. The neural network uses a configurable set of weights to compute one or more quantities representing disk drive condition as a function of the various inputs. The weights are stored in a configuration table, which can be overwritten by a host computer. The drive is sold and installed with one set of weights, based on the then existing knowledge of the disk drive designers, and may be updated in the field as the designers acquire experience data by simply writing the weights to the configuration table of the disk drive, without altering disk drive control code or other disk drive features. Preferably, the disk drive designers include as input to the neural network any parameter which might conceivably be useful, even if the designers initially believe that the parameter has no significance. In this case, the designers can assign the parameter a weight of zero during initial release. If subsequent experience then shows that the parameter has some unexpected significance, the neural network can be corrected simply by changing weighting factors, without altering the control programming code.

21 Claims, 6 Drawing Sheets

SELF-MONITORING STORAGE DEVICE USING NEURAL NETWORKS

FIELD OF THE INVENTION

The present invention relates to digital data storage devices, and in particular, to methods and apparatus for self-monitoring the condition of a digital data storage device.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous.

As computer users have come to rely more and more on their machines, they have come to expect an ever higher degree of reliability from the computers, including each component thereof. In the realm of reliability, the data storage device occupies a special place. For, in most cases, more important than the continued operation and availability of the computer itself is the integrity of the data. In today's marketplace, erratic or malfunctioning hardware components can often be replaced cheaply and easily. But data may be far more valuable. It is often the result of countless hours of human effort, and if lost, would require enormous resources to replace.

A disk drive data storage device is an extremely complex piece of machinery, containing precision mechanical parts, ultra-smooth disk surfaces, high-density magnetically encoded data, and sophisticated electronics for encoding/ decoding data, and controlling drive operation. Each disk drive is therefore a miniature world unto itself, containing multiple systems and subsystem, each one of which is needed from proper drive operation, and the failure of any of which may cause the entire drive to malfunction. At the same time, the demands of the marketplace for increasing data capacity and faster data access require disk drive designers to push systems to their limits. Although enormous engineering resources have been devoted to the design of disk drives, and improvements over the years have been impressive, given the complexity of the designs themselves and the demands to which the drives are put, it is not surprising that disk drives can, and do, fail.

In order to avoid catastrophic loss of data stored on disk drive storage devices, users have resorted to various practices and devices. It is now well known to maintain data on multiple disk drives in a redundant form, using any of several types of disk drive collections commonly referred to as "RAID" (Redundant Arrays of Independent Disks). RAIDs have many varying features and characteristics, but in general, a RAID has the capability to reconstruct data stored on any single disk drive in the event of a failure of that disk drive from the data stored on other disk drives in the RAID. It is also well known to frequently back up data to tapes, diskettes, or other storage media, so that in the event of a disk drive failure, only the data added since the last backup need be recovered. However, both RAIDs, and frequent backup have drawbacks in terms of consumption of hardware resources, impact on system performance, human intervention required for backup, etc.

In recent years, disk drive manufacturers have attempted to reduce the scope of this problem by including self-monitoring capability in disk drives, whereby a drive itself can predict that failure may be imminent. A user, being warned of imminent failure, can off-load the data to another storage device, and replace the disk drive about to fail with a new one. Such capability has the potential to reduce or eliminate the need for costly and time consuming back-ups or RAID systems. Furthermore, even where RAIDs, periodic back-ups, or other techniques are used, the capability to predict impending failure of a disk drive improves the robustness of the system, and makes scheduled maintenance easier and less costly.

Although the concept of self-monitoring capability has great potential, conventional self-monitoring systems are very limited. In general, these systems are encoded in the programming code of a disk drive controller. The disk drive controller program works by examining one or more operating parameters of the disk drive, and comparing these to some threshold(s) to determine whether the drive is nearing end of life. The problem with such an approach is that it requires the disk drive designer to have nearly perfect knowledge in advance of the common modes of disk drive failure, and the parameter thresholds that signal impending failure. It is possible to make certain broad generalizations about parameters that may signal problems with a disk drive. But when a new disk drive design is introduced, it is nearly impossible to say in advance what factors will take precedence, what thresholds will have greater significance, and how certain factors may interact with others. Typically, this information is only acquired after actual experience with a new disk drive design in the field, i.e., in actual use by customers. Furthermore, even when data is acquired from customer experience, it is not always obvious why drives are failing and what significance to accord various measured parameters.

This lack of foreknowledge places disk drive designers in a dilemma. If they measure too many parameters and establish too many thresholds or thresholds which are too low, many perfectly good disk drives may predict impending failure unnecessarily. On the other hand, if a parameter is ignored, it may turn out to be very significant in later experience.

A need exists for more accurate and improved self-monitoring capability in disk drives

SUMMARY OF THE INVENTION

In accordance with the present invention, a digital data storage device such as a rotating magnetic disk drive contains an on-board condition monitoring system. The condition monitoring system comprises a neural network coupled to multiple inputs, the inputs being derived from measured parameters of disk drive operation. The neural network computes one or more quantities representing disk drive condition as a function of the various inputs.

In the preferred embodiment, a configurable set of weights determines the significance accorded by the neural network to each respective input, alone or in combination with other inputs. The set of weights is stored in a configuration table, which can be overwritten by the host computer system. A disk drive is sold and installed with a default set of weights, based on the then existing knowledge of the disk drive designers. As the designers acquire a history of experience with actual field failures and other problems, the field data can be used to construct a new, more accurate, set of weights. This new set of weights can then be propagated to existing disk drives in the field by simply writing the weights to the configuration tables of the disk drives, without altering disk drive control code or other disk drive features. It is also possible to propagate hidden node functions in the same manner.

Preferably, the disk drive designers include any measurable parameter which might conceivably be useful in predicting failure as an input to the neural network, even if the designers believe at the time of initial design that the parameter has no significance. In this case, the designers can assign the parameter a weight of zero during initial release. If subsequent experience then shows that the parameter has some significance not predicted by the designers, the self-monitoring neural network can be corrected simply by changing weighting factors, without any alteration to the control programming code.

The self-monitoring method and apparatus described herein described herein provides more accurate prediction of failure and evaluation of disk drive condition, reducing the occurrences of false warnings of impending doom, and increasing the probability of detecting actual impending failures. It further provides a practical means for correcting conditions in the field without replacing drives or loading new control code into a drive. Furthermore, it provides an improved method of transcribing experience data to a predictive algorithm, because it is not necessary for designers to understand why certain parameters interact in the way they do, but only necessary to compute neural network weights based on experience data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

Figure 1:
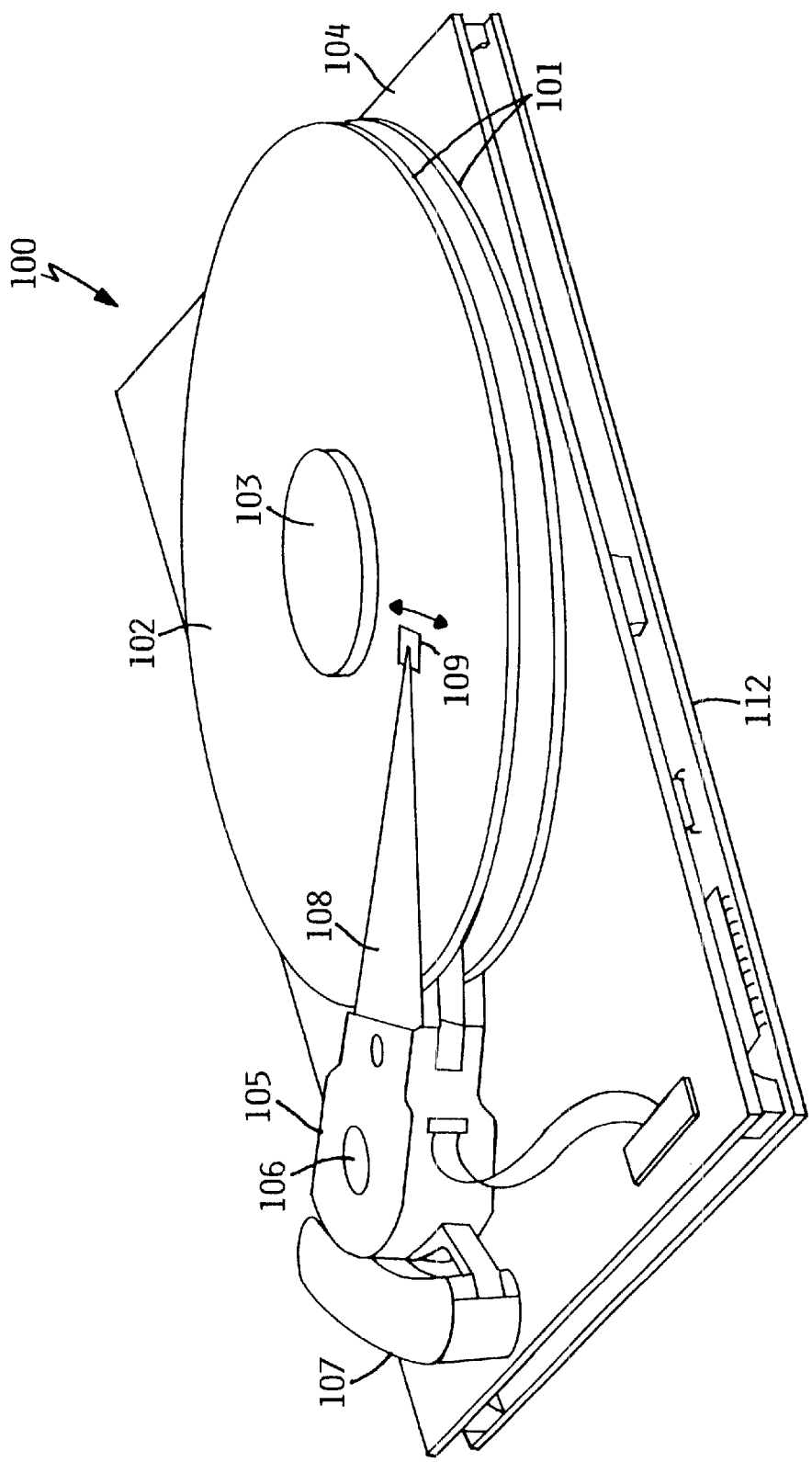
FIG. 1 is a simplified representation of a rotating magnetic disk drive storage device, according to the preferred embodiment of the present invention.

A disk drive typically contains one or more smooth, flat disks which are rigidly attached to a common spindle or hub. Where more than one disk is used, the disks are stacked on the spindle parallel to each other and spaced apart so that they do not touch. The disks and spindle are rotated in unison at a constant speed by a spindle motor.

Each disk is formed of a solid disk-shaped based or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do thin, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electro-magnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo patterns identifying the data tracks are written on at least one disk surface. The transducer periodically reads the servo pattern to determine its current radial position, and the feedback system adjusts the position of the actuator as required. Older disk drive designs often employed a dedicated disk surface for servo patterns. Newer designed typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element.

Because it is common to push the limits of many of the components in disk drive design, it is expected that a disk drive will experience some "soft errors". A soft error is an intermittent or non-repeatable error observed during data access, from which it is still possible to recover the data (as opposed to a "hard error", which implies that data written at a particular location can not be recovered). Soft errors may be caused by many factors, alone or in combination, e.g., external vibration which causes the head to be mispositioned, insufficient settling following an actuator seek operation, internal vibration in spindle motor bearings or other components, electrical noise, etc. When a disk drive encounters a soft error, it initiates a soft error recovery procedure to attempt to recover the data. Typically, a soft error recovery procedure is a defined sequence of steps, proceeding from the simpler to the more complex and time consuming. The simplest step may be to merely re-read the data. If this does not work, the drive may attempt other forms of soft error recovery, e.g., changing the actuator position while re-reading the data, and proceeding to more complicated forms of recovery. If nothing works, the error is classified as a "hard error", which may cause actual data loss to the user.

Detailed Description

Referring to the Drawing, wherein like numbers denote like parts throughout the several views, FIG. 1 is a simplified drawing of a rotating magnetic disk drive storage device 100, in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity. The drive motor (not visible) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electro-magnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic read/write transducer head 109 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface or a disk for recording data.

Figure 2:
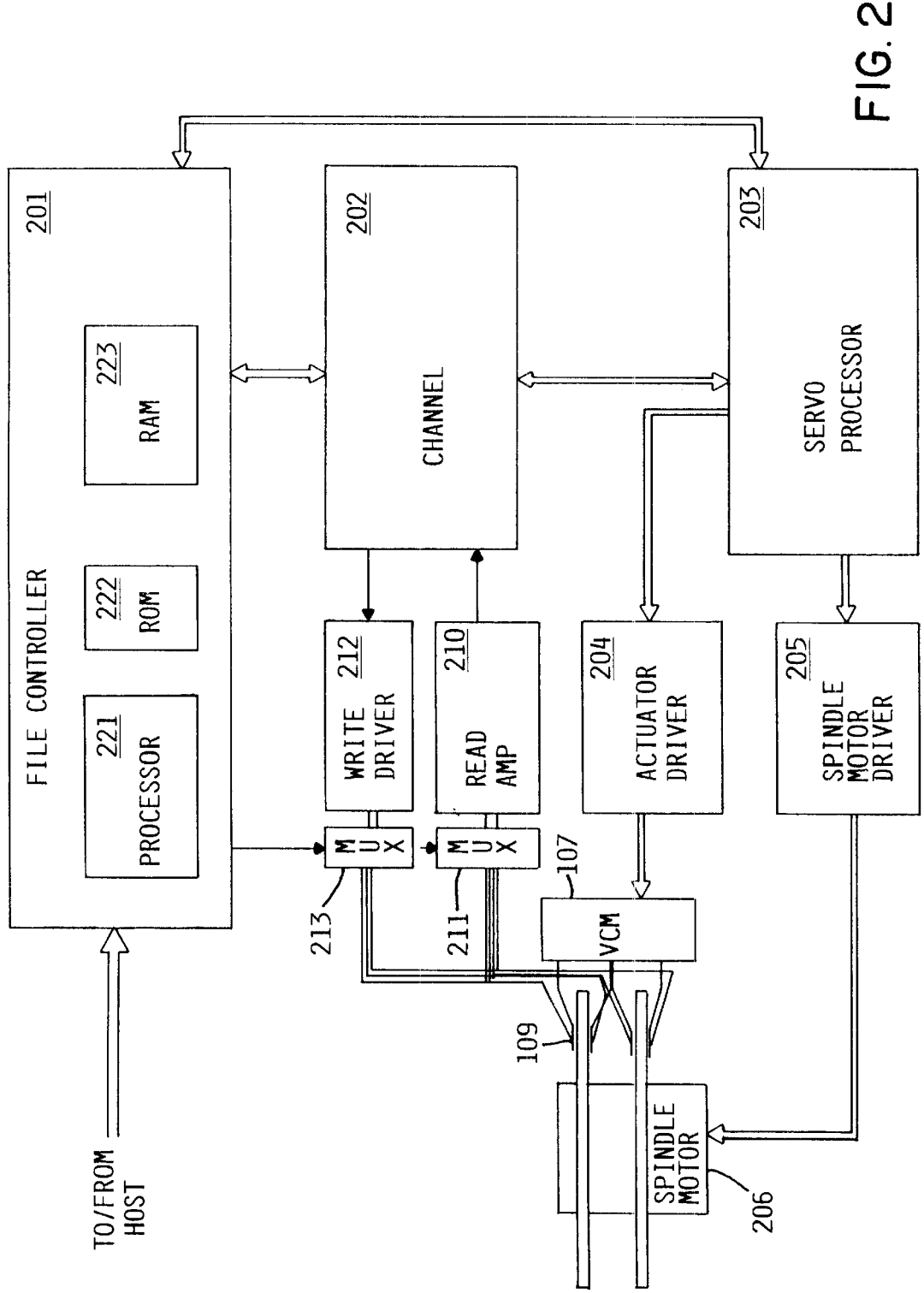
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host such as a computer system. Controller 201 also provides general control of the operation of disk drive 100, including such functions as command interpretation, sector mapping, power-up routines, diagnostics and error recover, etc. File controller 201 also provides a predictive failure function, as more fully described herein. Channel electronics 202 provides modulation and demodulation function for data being written to and read from the disk surface. Servo processor 203 interprets servo signals obtained from reading servo patterns on the disk to control the actuator and spindle motors; it also response to seek signals from file controller 201. Servo processor 203 determines the necessary parameters for actuator motor and spindle motor, and provides these as inputs to actuator motor drive circuitry 204 and spindle motor drive circuitry 205. Actuator motor drive circuitry 204 in turn provides drive current to actuator voice coil motor (VCM) 107, positioning actuator 105 to a desired location. Spindle motor drive circuitry 205 provides drive current to spindle motor 206, driving the motor at a desired rotational velocity.

Transducer heads 109 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 109, amplified by read amp 210, and provided to channel electronics 202. Channel electronics preferably includes a partial-response maximum likelihood (PRML) filter for decoding data signals into coherent data fro use by a host system. When writing data, channel electronics 202 encodes data according to a pre-determined encoding format, and provides this data to write driver 212, which in turn drives current through an inductive write element to cause the data to be written on the disk surface.

Positioning of transducer heads 109 is achieved by a servo feedback loop system comprising heads 109, read amp 210, channel electronics 202, servo processor 203, actuator driver 204, and actuator motor 107. Heads 109 read servo patterns recorded at periodic intervals on disk surfaces 101; these are amplified by read amp 210; the servo patterns are converted to position information by channel electronics 202; position information is interpreted by servo processor 203 to determine an amount of drive current which must be supplied to actuator motor 107; and actuator driver 204 then generates the required drive current in response to a control signal from servo processor 203. Servo processor 203 uses the same information to interpret angular position and provide appropriate control signals to spindle motor driver 205.

File controller 201 preferably includes programmable processor 221 which executes a control program resident in read-only memory (ROM) 222. ROM 202 is a non-volatile semiconductor random access memory, the contents of which are not lost when disk drive 100 is powered down. File controller also includes volatile read/write memory (RAM) 223. RAM 223 is used as a temporary cache for data being read from and written to one or more of the disk surfaces. RAM 223 is also used for storing internal state variables necessary for drive operation.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features.

In accordance with the present invention, various measured parameters which may be indicative of disk drive condition are input to a neural network. The neural network produces and output indicative of the overall condition of the disk drive.

A neural network is conceptually a directed graph of nodes and connections, each connection running between two nodes in a single direction, from a source node to a target node. Each node represents some relatively simple mathematical function of the input(s) to the node. For example, the node could be a simple summation of inputs. An adaptive weight is associated with each connection between nodes. The adaptive weight is a coefficient which is applied to the value of the source node to produce an input to the target node. The value of the target node is therefore some function of the source node inputs multiplied by their respective weighting factors, i.e.:

$$\text{Target\_Node} = f(\text{Source}(1) \times \text{Weight}(1), \text{Source}(2) \times \text{Weight}(2), \ldots \text{Source}(n) \times \text{Weight}(n)).$$

In the preferred embodiment, the neural network is implemented in software by a portion of the control program in ROM 222 executing on processor 221 and accessing data stored in RAM 223. I.e., the nodes are simply memory locations in RAM 223 which store numeric values. The adaptive weights are also stored in RAM 223 as data. The control program computes the value of each target node from the data in RAM 223 storing the values of source nodes and weights. Target node values must be computed in a predetermined sequence, since some nodes take other target nodes as source node values.

Figure 3:
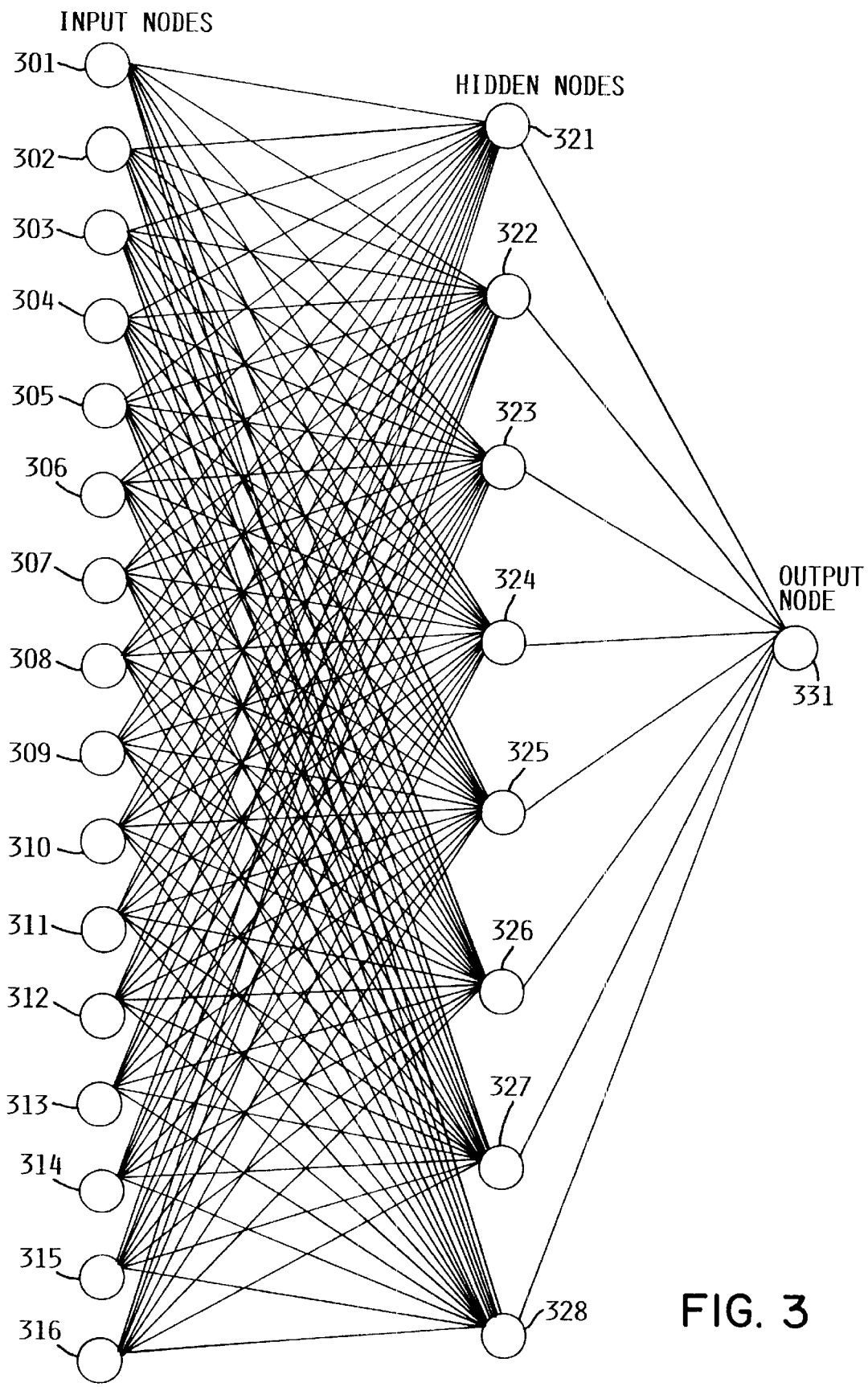
FIG. 3 is a conceptual illustration of a neural network suitable for evaluating the condition of a disk drive storage device, according to the preferred embodiment.

FIG. 3 is a conceptual diagram of the neural network of the preferred embodiment. In this embodiment, the neural network is of the "back propagation" type, as is known in the neural network art. The number of input nodes 301–316 (first level) is dependent on the number of heads or disk surfaces in disk drive 100, as explained below. In this embodiment, there is one level of hidden nodes 321–328 (second level), although it is possible to have multiple levels of hidden nodes. There is a single output node 331 (third level) which, when the network is computed, yields a numeric value indicating the overall condition of the file. In this embodiment, the neural network is used only to report file condition, for possible use in warning the user of impending failure. A single output is chosen to avoid confusing the user with multiple quantities. However, it would additionally be possible to have multiple outputs, each of which corresponds to some specific type of problem or potential cause for failure.

Preferably, the network is constructed initially by taking as input nodes to the neural network a large number of measured, derived, or specified disk drive parameters, without attempting to understand the exact contribution, if any, each may have to a reliable prediction of disk drive condition. Many of these measured parameters are measured separately for each transducer head and corresponding disk surface pair, since these measurements may vary considerably from head to head, and a single bad head/surface pair may be obscured by normal readings from other head/surface pairs. Preferably, the following are used as input:

Soft error rates: Soft error rates are simply the rates at which soft errors occur, i.e., the data which is initially read by the transducer is somehow garbled, so that the controller must resort to a soft error recovery procedure to read the data. The controller preferably maintains counts of the soft errors and total disk accesses, from which it is possible to compute soft error rates as percentages of disk accesses. Soft error rates are good indicator of the general health of the disk drive, since a properly functioning drive should have a relatively low soft error rate, while any number of parameters which vary from ideal by even a small amount can cause an increase in soft errors. Since soft error recovery procedures typically define a sequence of steps for soft error recovery, from simplest to most complex, it is possible to count all soft errors, or only soft errors which require the error recovery procedure to go to step N or above. It is further possible to maintain multiple soft error counts, one counting errors requiring error recovery at step N or above, and another counting errors requiring error recovery at step M or above, where N<M. Preferably, there is a separate soft error rate or set of rates input to the neural network for each disk surface and corresponding head.

Head/slider flyheight delta: This is the distance between head and disk surface when the disk drive is operational. Due to the dynamic nature of the drive and the very small distances involved, measurement is not straightforward. In the preferred embodiment, change in flyheight is measured using the technique described in U.S. Pat. No. 5,168,413 to Coker et al., entitled "Transducer Head Flying Height Monitoring Methods and Apparatus for Disk Drive System", herein incorporated by reference. However, various other techniques are available and could be used in the alternative. Flyheight variation over time may be caused by slider wear, vibration, surface anomalies, operating temperature, or other factors. Since flyheight is a dynamic dimension, and a critical one, any variation in flyheight affects the drive's ability to read data, may cause collisions between head and disk surface, and ultimately endangers the health of the drive. Preferably, flyheight is measured and tracked separately for each head and corresponding disk surface, and separately input to the neural network.

Thermal asperity count: A thermal asperity is detected by the read channel as a change in output of the magneto-resistive read element, which is very temperature sensitive. I.e., the output exceeds some threshold. A detected thermal asperity means that the head has experienced a brief, sudden increase in temperature. Typically, this means that the head has collided with something on the surface of the disk. A relatively large thermal asperity count therefore indicates that there are a large number of irregularities on the disk surface. In addition to possibly rendering small areas of disk surface unreadable, repeated collisions with these asperities may eventually damage the head, or may generate debris which will affect other areas of the disk. Thermal asperities are preferably measured separately for each disk surface and corresponding head, and constitute separate inputs to the neural network.

Servo error rate: Servo errors are a type of intermittent error in reading servo information, which cause a write inhibit. These may be caused by, e.g., failure to settle on a track following a seek operation, or inability to read a gray code. Like soft errors on reads, it is expected that there will be some servo errors, but excessive servo error rate may be a sign of various serious problems, such as excessive vibration, actuator friction, lack of actuator response, etc. Like soft errors, servo errors may simply be counted by the controller. Servo error rate is preferably a single input to the neural network, although it could be tracked separately for each head/disk surface, and separately input to the neural network.

Drive temperature: Drive temperature is preferably detected directly with a silicon-based sensor mounted within the disk drive enclosure. High temperature may be caused by high ambient temperature, or may be caused by excessive friction within the disk drive. In either case, high temperature can lead to premature component failure, and its measurement is of potential value in predicting the future health of the drive. Drive temperature is a single input to the neural network.

Access performance: Access performance is the time required to access data. Since the average latency is a function of spindle motor speed, which is a regulated quantity that remains more or less constant, a increase in average access time is generally the result of increased seek time, i.e., the actuator is traveling more slowly. Increased seek time could be caused by increased friction in the actuator bearings, increased temperature, or loss of magnetization of the actuator's permanent magnets over time, any of which might be signs of aging. The most direct way to measure this would be to measure average seek times, or seek times for several seeks of known distance. It may alternatively be possible to measure current required by the actuator motor to maintain a predetermined acceleration profile during a seek operation. Preferably, access performance is a single input to the neural network.

Air bearing excitation: Air bearing excitation is a vibration of the transducer head relative to the disk surface. This may be detected by passing the read signal through a demodulator, followed by a band-pass filter in the frequency range of interest. In order to use this measure, the designer must have specific resonant frequencies in mind. If several frequencies are to be considered, there should be a separate neural network input for each one. Probably the most significant resonance would be that caused by disk surface defects which excite the head. However, it would also be possible to look at other resonances, such as resonances of the spinning disk caused by disk warpage. The air bearing excitation is preferably measured and input separately to the neural network for each disk surface in the range of head resonance in response to surface defects. If other frequencies are considered, additional inputs may be required.

Reassign rate: The reassign rate is the rate at which a disk sector is determined to be unusable after on-board error recovery procedures have failed, thus requiring reassignment of the data to a spare disk sector. Normally, this is an infrequent occurrence (occurring far less frequently than ordinary soft errors). A rise in this reassign rate is a symptom that something is seriously wrong with the disk drive. This can be determined by simply keeping counts of data reassign events. The reassign rate is preferably counted separately for each disk surface/head, and separately input to the neural network.

Mean squared error: Mean squared error is a measure of deviation in the read signal from some nominal value. Excessive deviation may indicate damage to the read transducer, or excessive noise, either of which could be symptoms of impending problems. In the preferred embodiment, mean squared error may be derived using the error measurement circuit and technique described in U.S. Pat. No. 5,392,295 to Coker et al., entitled "Error Measurement Circuit", herein incorporated by reference. Mean squared error is preferably computed separately for each head, and input separately to the neural network.

Read signal asymmetry: Read signal asymmetry is a measure of the non-linearity of the gain in the read signal from the magneto-resistive head. Magneto-resistive transducers have a range wherein their response is roughly linear; ideally, the bias current and other characteristics are such that the transducer is operating in its linear range. Substantial read signal asymmetry may be indicative of aging of the read transducer, or damage to the transducer. Read signal asymmetry can be measured used the error measurement circuit described in U.S. Pat. No. 5,392,295 to Coker et al. referenced above. Samples of known data patterns having positive and negative transitions are read, and error magnitudes are compared for is differing transitions. Differing average errors for different sets of transitions indicate read signal asymmetry. Read signal asymmetry is preferably computed separately for each head, and separately input to the neural network.

PES resonance: Resonances in the servo feedback position error signal (PES) may be detected. Such resonances may be caused, e.g., by looseness or damage to the disk suspension, by the disk being off-center, or by spindle motor bearing wear. The first two causes requires measurement at each disk surface separately, so PES resonance is preferably measured and input to the neural network separately for each disk surface.

Power-on hours: Power-on hours is simply a count of the total number of hours the disk has been powered-on in service. This is probably the best measure of the "age" of the drive. Power-on hours is potentially an important measure in combination with other readings, although in and of itself it probably means little.

It should be understood that the above list of neural network inputs is but a single example of how various parameters may be used as neural network inputs, and that neural networks may be constructed within the scope of the present invention using a set of parameters different from those listed herein, and may include only some of the parameters listed herein, may include additional parameters, or may measure parameters differently, or all head/disk surface pairs or globally, or on some other basis.

While 16 input nodes 301–316 are shown in the conceptual example of FIG. 3, the actual number will depend on the number of disk surfaces and input parameters used. Assuming a disk drive having two disks and four disk surface/head pairs, and assuming all the above listed parameters are used as input to the neural network, and assuming only one soft error rate threshold is used, and further assuming only the head resonant frequency responsive to surface defects is considered for air bearing excitation, a total of 36 inputs are required, i.e. 4 each for soft error rate, flyheight, thermal asperities, air bearing excitation, reassign rate, mean squared error, read signal asymmetry, and PES resonance, and one each for servo errors, temperature, access performance, and power-on hours. The number of hidden nodes 321–328 may also vary.

In operation, controller 201 preferably computes the various neural network values to evaluate drive performance on a periodic basis. This may be triggered on the basis of power-on hours (e.g., every 4 hours), or after a specified number of disk access operations. Because the evaluation of the neural network involves a fair number of computations, it has the potential to interfere with disk operation if its performance preempts other disk operations. Fortunately, the number of state variables required to evaluate the neural network is not large. If the network is evaluated one node at a time, the evaluation may be interrupted to handle data accesses, and intermediate state of the results saved, until the controller processor 221 may return to the evaluation of the network. This operation is illustrated in FIG. 4.

Figure 4A:
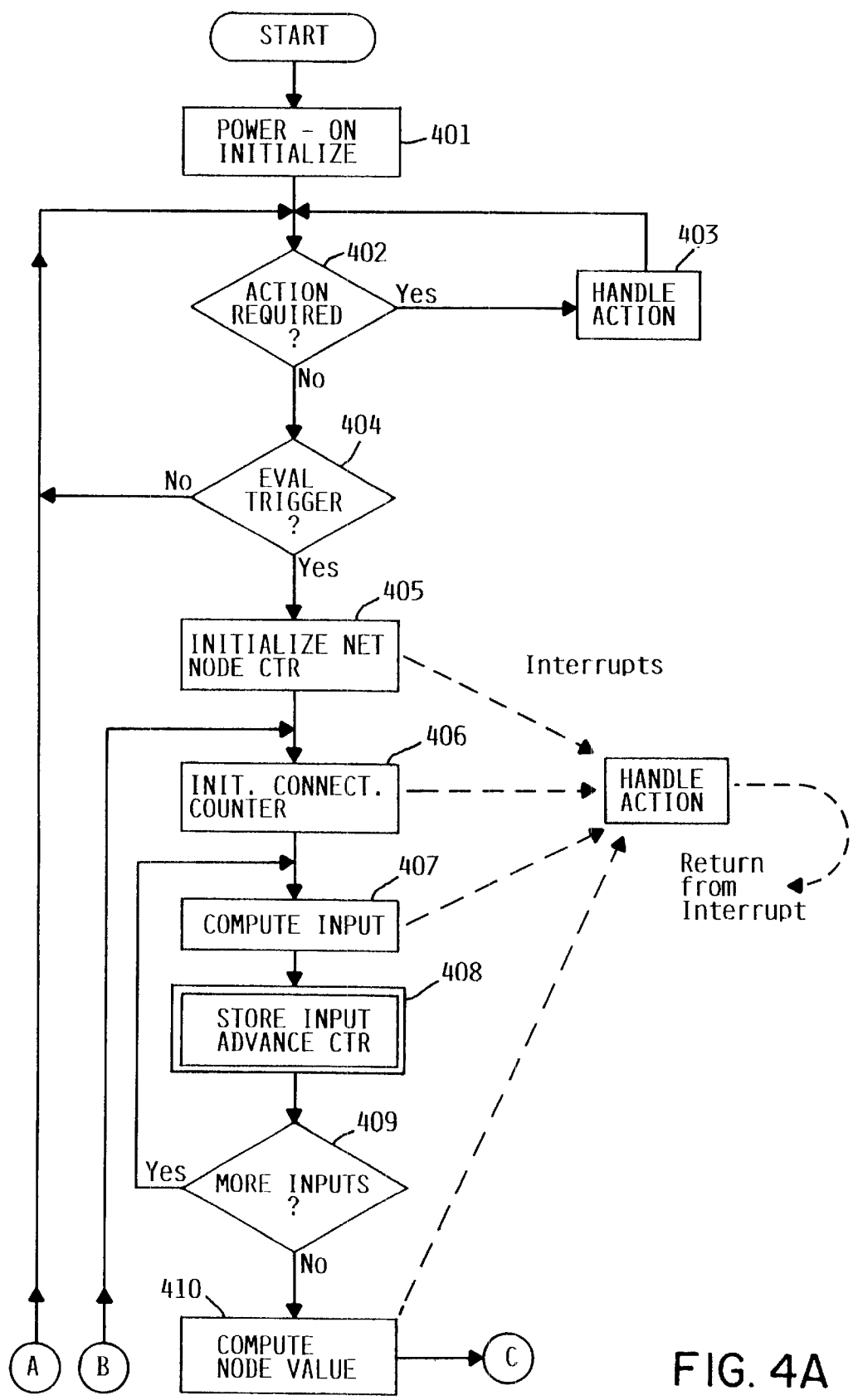
FIG. 4 shows the steps performed by a control program in a disk drive storage device to evaluate a neural network to determine the condition of the disk drive, according to the preferred embodiment.
Figure 4B:
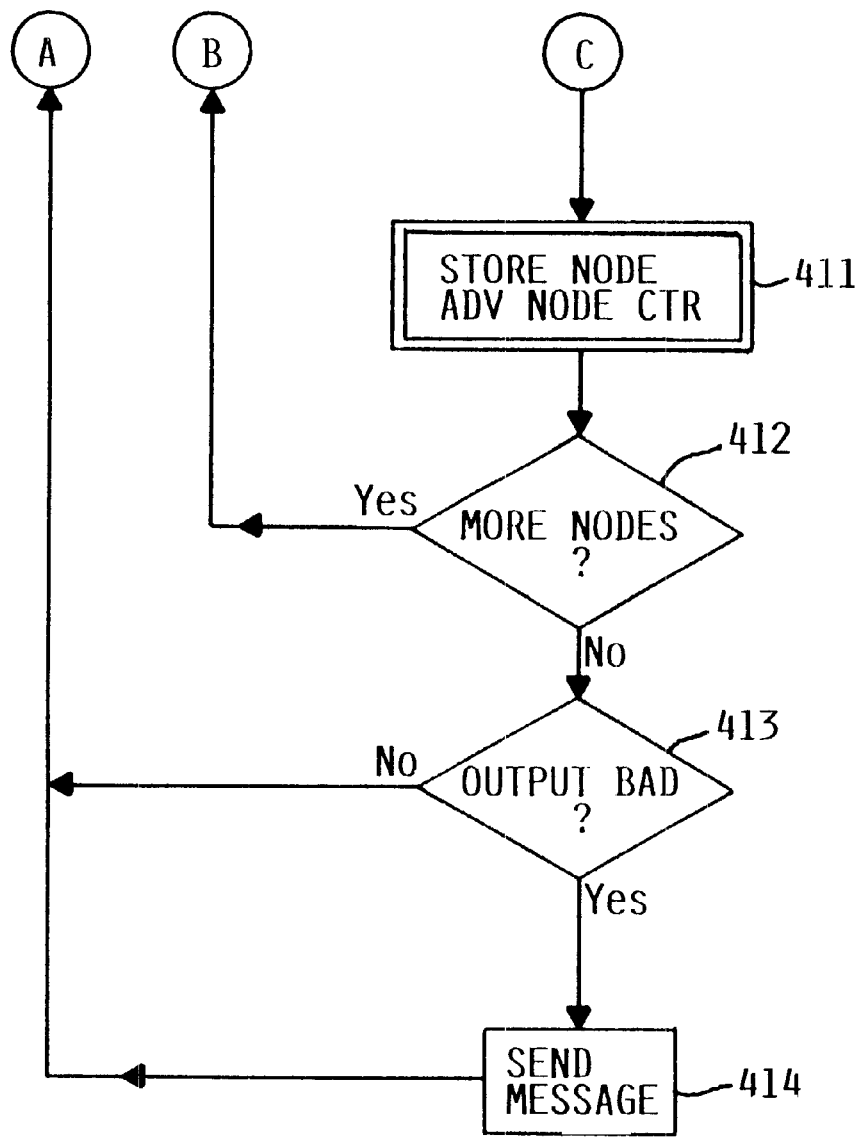

As shown in FIG. 4, the control program executing in controller 201 initializes itself on power-on of the disk drive (step 401). Among the initialization steps, controller 201 loads neural network weights and optionally, hidden node functions, from a dedicated portion of disk storage to read/write memory 223 for use in later neural network evaluation. Controller 201 also loads from a dedicated part of disk storage certain saved state values, such as accumulated power-on hours, accumulated disk operations, accumulated error counts, etc., as is known in the art.

After initialization, the control program waits for actions requiring response (step 402), and responds appropriately (step 403). These actions could be anything normally performed in the operation of a disk drive storage device, such as receiving commands from a host and responding thereto, responding to conditions in the disk drive itself, etc. Because these are conventional features of disk drive storage devices, they are not described in detail here.

If idle, the control program also checks for the conditions to trigger a neural network based drive evaluation (step 404). For example, control program might check accumulated power-on hours to determine whether a timer has been exceeded.

If the trigger condition is met, the control program initializes a neural network in RAM 223, which amounts to allocating sufficient area of memory to store the various nodes, and at least one set of inputs to a node (step 405). The set of inputs may be re-used for each successive node, so only one set is needed, but it should be as large as the largest number of inputs to any individual node. The control program also initializes a node counter or pointer to the first node.

The control program then initializes a connection counter or pointer to the first connection (step 406). This is used to determine the connection (input) under evaluation.

The control program then computes a single input to a node (step 407). The input computed is the input corresponding to the current connection counter or pointer. For "input nodes" 301–316, there is only one input, that being some measured parameter (which may require computation). For hidden and output nodes, there are multiple inputs, each being the product of a source node value and a weight. For these inputs, the control program retrieves the appropriate weight from RAM 223 and computes the input.

The control program then stores the computed input in RAM 223 and advances the connection counter or pointer (step 408). If there are any more inputs to the current node to evaluate (step 409), the control program returns to step 407 to evaluate the next input. If all inputs have been evaluated, the control program continues to step 410.

The control program then computes the node value from the values of all the inputs to the node (step 410). The node value is then stored in memory 223, and the node counter is incremented to evaluate the next node (step 411).

If there are any remaining nodes to evaluate (step 412), the control program continues to step 406. If all nodes have been evaluated, the last node is the output node. If the value of the output node exceeds some pre-defined threshold (step 413), the disk drive is in an unhealthy condition, and a warning message is sent to the host (step 414). In either case, the control program then returns to step 402 to continue normal operation.

The neural network evaluation is a low-priority, background function. If some action is required of the disk drive controller while steps 405–414 are being executed, these steps are simply interrupted, without waiting to complete any numeric calculations involved in the step. The only steps that should not be interrupted are steps 408 and 411. These steps are considered "atomic", and are therefore shown in double-lined boxes. If any other step is interrupted, the control program does not save any intermediate calculations. Upon return from interrupt, the control program re-executes the interrupted step from the beginning. While this may result in loss of some intermediate results and consequent additional calculation to regenerate them, it is important to avoid an unnecessarily long delay between the time that an interrupt is received and when it is serviced.

In the preferred embodiment, the neural network connection weights, and optionally, the hidden node functions, are stored in a dedicated area of disk storage, from which they are loaded into RAM 223 for use in evaluating the neural network. Like other disk storage, this area of disk storage is capable of being written to (thus updating the connection weights and/or node functions if necessary). Because it is a dedicated area, it is not part of the normally addressable data area of the disk which is written to using normal data access commands. Rather, a special command from the host is required to write to the dedicated area.

In particular, if the disk drive storage device uses a SCSI protocol for communication with the host, the connection weights and hidden node functions are stored in SCSI mode pages. In SCSI, the term "page" is used to indicate a group of fields and bits defined by a page code fields and a length field. The page code defines the contents of the page and the length indicates the number of bytes that make up the page. The mode pages are pages that are stored on SCSI disk drives that can be written to using the SCSI Mode Select command and read using the SCSI Mode Sense command. The information contained within SCSI mode pages is intended for use in controlling SCSI bus parameters and internal operating parameters within the disk drive.

If the disk drive uses a protocol other than SCSI, any similar or analogous feature may be employed to store the connection weights and hidden node functions.

A major advantage of using a neural network with alterable connection weights, and/or hidden node functions as described above is that disk drives may be updated in the field after being sold and installed in customer machines, and in fact, after they already contain customer data. This is possible because the only required change is the change to the read/write configuration data (e.g., the SCSI mode pages) which contain the connection weights and hidden node functions. The control code which evaluates the neural network as described above does not need to be changed.

In one variation of the preferred embodiment, only the connection weights are stored in the SCSI mode pages or similar read/write dedicated storage area, the hidden node functions being hard-coded in the control program. In an alternative variation, hidden node functions are stored as well, allowing additional flexibility for later updates. Since hidden node neural network functions are intended to be rather simple, it is not necessary to support a large variety of such functions. It would be possible to establish a small set of function types, e.g, linear, piece-wise linear, step, and second-order polynomial, and limit selection to these functions by specifying a function type and set of coefficients.

Figure 5:
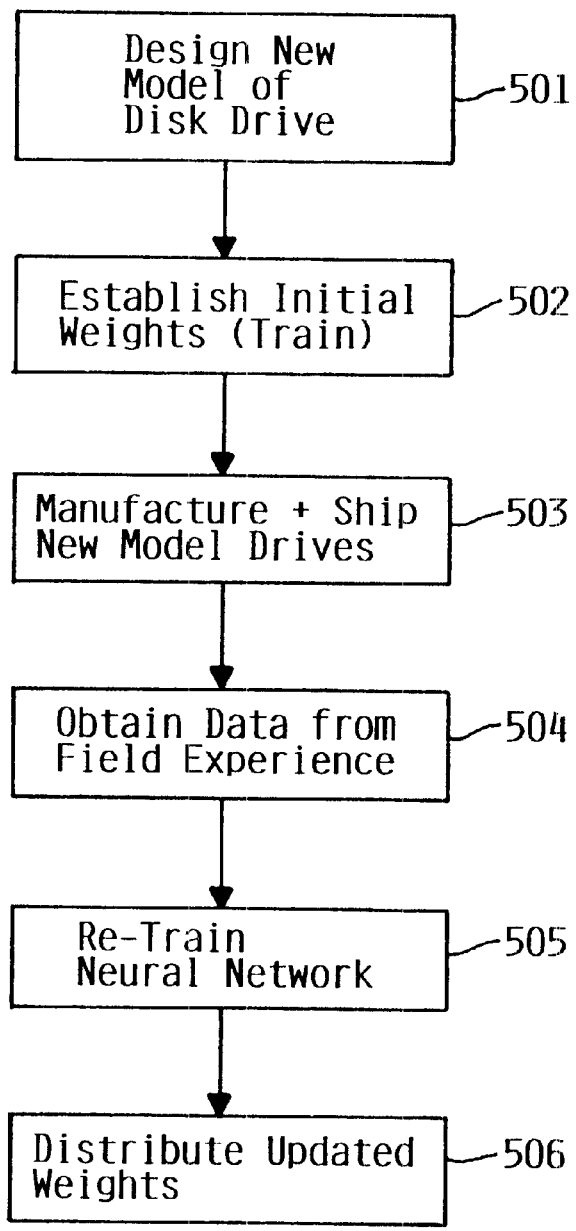
FIG. 5 is a high-level illustration of the process for designing and supporting a model of storage device having a neural network based self-monitoring capability, according to the preferred embodiment.

The process of designing as supporting a model of storage device is shown conceptually in FIG. 5. A team of developers initially creates a design for a new model of storage device, preferably a disk drive storage device (step 501). In addition to any of various conventional features, storage devices of the new model contain a neural network self-monitoring algorithm embedded in the control program, as described herein.

The developers establish initial connection weights and hidden node functions for the neural network (step 502).

Preferably, weights are established by training the neural network with data. Training data may be derived from several sources. Generally, the design team will build and test some prototypes as part of the design process; data obtained from testing of prototypes can be used to train the neural network. Additionally, if the new disk drive model is similar in design to some previous model or models, data obtained from actual field experience with the previous model or models may be used to establish initial connection weights for the new model. Finally, data obtained from mathematical simulations or projections could be used to train the neural network. It will be recognized that none of the above sources for training data is ideal, and that the best source for training data is actual field experience with the new model of disk drive. However, at the time of initial design, such data is unavailable. Furthermore, such data is never really complete until a sufficiently large sample of disk drives of the new model have reached end of life, which could be some years after introduction. It is not practical to wait until such "perfect" data becomes available, and therefore initial connection weights are established with the best available alternative data.

The new model of disk drive is then manufactured in quantity and shipped to customers, having the initial connection weights stored in on-board read/write configuration storage, such as SCSI mode pages (step 503).

As more of the new model drives are shipped to the field, the developers begin to acquire data from actual field experience (step 504). The earliest data received will concern early life failures of the new model, and may reveal heretofore unexpected results. At some point, the data received from the field is used to retrain the neural network (step 505). It is not necessary that all of the data used to train the network initially be discarded; the network may be trained with a combination of new data from actual field experience, and data from a previous model. For example, if the new data concerns mostly early life failures, one could combine this data with older data showing failures near end of life.

The developers then distribute a new set of connection weights obtained by re-training the neural network with the new data (step 506). This new set of connection weights should be more accurate than the previous set, since it is based on actual field data using the new model of drive. The new connection weights may be distributed using any of various conventional distribution channels for distributing electronic information, i.e., by diskette, by transmission over the Internet, etc. The new weights are loaded into the host computer, which then downloads them to the disk drive for storage in the read/write configuration area. The old connection weights are overwritten with the new connection weights and not further used. The developers may optionally distribute altered hidden node functions by the same process.

The process described above may be iterative, in that multiple updated versions of neural network connection weights may be generated and distributed as additional data from actual use becomes available.

In the preferred embodiment described above, the neural network is implemented as an artificial neural network which is simulated by a control program executing in the processor which controls disk operation. However, it would alternatively be possible to use special purpose neural network hardware for this purpose. As used herein, the term "neural network" should be taken to include either a hardware neural network or an artificial neural network simulated in software, unless the term is otherwise limited by the context.

In the preferred embodiment, the self-monitoring storage device is a rotating magnetic hard disk drive storage device. It would alternatively be possible to use a neural network as described herein for self-monitoring other types of data storage device, such as optical storage devices, magnetic tape storage devices, and the like.

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal bearing media is illustrated in FIG. 2 as ROM 222.

Although a specific embodiment of the invention has been disclosed along with certain alternatives, it will be recognized by those skilled in the art that additional variations in form and detail may be made within the scope of the following claims.

What is claimed is:

1. A rotating disk drive data storage device, comprising:

a disk drive base;

at least one rotatably mounted disk for recording data on at least one surface of said at least one rotatably mounted disk;

a movable actuator supporting at least one transducer head, said actuator positioning said at least one transducer head to access data on said at least one surface of said at least one rotatably mounted disk; and a controller for controlling the operation of said disk drive data storage device, said controller including a neural network for monitoring said disk drive data storage device, said neural network accepting a plurality of measurable parameters of said disk drive data storage device as input, and producing at least one monitoring output.

2. The rotating disk drive data storage device of claim 1, wherein said controller comprises a programmable processor and a memory storing a control program for execution on said programmable processor, said neural network being implemented as an artificial neural network simulated by said control program executing on said programmable processor.

3. The rotating disk drive data storage device of claim 1, further comprising:

a dedicated storage area on said at least one surface of said at least one rotatably mounted disk, said dedicated storage area for storing a plurality of connection weights, said connection weights being used by said controller to evaluate said neural network.

4. The rotating disk drive data storage device of claim 3, wherein said controller causes said connection weights in said dedicated storage area to be overwritten with updated connection weights in response to a command received from a host system.

5. The rotating disk drive data storage device of claim 3, wherein said dedicated storage area is a SCSI mode page.

6. The rotating disk drive data storage device of claim 1, wherein said plurality of measurable parameters includes at least one parameter which is measured separately for each said disk surface, the separate measurements of said parameter for each disk surface constituting separate inputs to said neural network.

7. The rotating disk drive data storage device of claim 1, wherein said plurality of measurable parameters includes at least one measure of soft error rate.

8. The rotating disk drive data storage device of claim 1, wherein said plurality of measurable parameters includes at least one measure of flyheight.

9. A method for operating a digital data storage device comprising the steps of:

accessing data stored on said data storage device responsive to requests for data;

periodically triggering a self-evaluation of said digital data storage device;

inputting a plurality of measured parameters of said digital data storage device to a neural network resident in said digital data storage device, responsive to said step of triggering a self-evaluation of said digital data storage device; and evaluating said neural network in said digital data storage device to produce a self-evaluation of said digital data storage device.

10. The method of claim 9, wherein said neural network is implemented as an artificial neural network simulated by a control program executing on a programmable processor of said digital data storage device.

11. The method of claim 9, wherein digital data storage device is a rotating magnetic disk drive storage device.

12. The method of claim 9, further comprising the steps of:

retrieving a plurality of neural network connection weights from a dedicated read/write data storage area of said data storage device; and using said plurality of neural network connections weights to evaluate said neural network.

13. The method of claim 12, further comprising the step of:

overwriting said neural network connection weights in said dedicated storage area with updated neural network connection weights in response to a command received from a host system.

14. A program product for controlling the operation of a digital data storage device, said program product comprising:

a plurality of processor executable instructions recorded on signal-bearing media, wherein said instructions, when executed by at least one programmable processor, cause the storage device to perform the steps of:

accessing data stored on said data storage device responsive to requests for data;

periodically triggering a self-evaluation of said digital data storage device;

inputting a plurality of measured parameters of said digital data storage device to an artificial neural network simulated by said program product executing on said programmable processor, responsive to said step of triggering a self-evaluation of said digital data storage device; and evaluating said artificial neural network in said programmable processor to produce a self-evaluation of said digital data storage device.

15. The method of claim 14, wherein digital data storage device is a rotating magnetic disk drive storage device.

16. The method of claim 14, further comprising the steps of:

retrieving a plurality of neural network connection weights from a dedicated read/write data storage area of said data storage device; and using said plurality of neural network connections weights to evaluate said neural network.

17. The method of claim 16, further comprising the step of:

overwriting said neural network connection weights in said dedicated storage area with updated neural network connection weights in response to a command received from a host system.

18. A method for monitoring a plurality of storage devices, said plurality being devices of the same model of storage device, said method comprising the steps of:

designing said model of storage device having a neural network for self monitoring, said neural network accepting a plurality of measurable parameters as input, and at least one monitoring variable as output;

assigning a first set of weights to connections of said neural network in a plurality of disk drive storage devices of said model of storage device;

obtaining data representing performance of said model of storage device;

generating a second set of weights to connections of said neural network, said second set being generated using said data representing performance of said model of storage device, said second set of weights being different from said first set of weights; and replacing said first set of weights with said second set of weights in a plurality of storage devices of said model of storage devices.

19. The method of claim 18, wherein said neural network is implemented as an artificial neural network simulated by a control program executing on a programmable processor of said storage device.

20. The method of claim 18, wherein said step of replacing said first set of weights with said second set of weights comprises overwriting said first set of weights with said second set of weights, said weights being written to a common dedicated storage area of each storage device of said model of storage device.

21. The method of claim 20, wherein said weights are written to a SCSI mode page reserved location.

* * * * *